United States Patent
Funae et al.

(10) Patent No.: US 7,332,870 B2
(45) Date of Patent: Feb. 19, 2008

(54) DRIVING VOLTAGE CONTROLLER FOR LIGHT-EMITTING SOURCE

(75) Inventors: Kazuhito Funae, Tokyo (JP); Takuya Shibata, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 52 days.

(21) Appl. No.: 11/115,179

(22) Filed: Apr. 27, 2005

(65) Prior Publication Data
US 2005/0258781 A1 Nov. 24, 2005

(30) Foreign Application Priority Data
May 24, 2004 (JP) ............... 2004-153505

(51) Int. Cl.
*H05B 41/16* (2006.01)
*H05B 37/02* (2006.01)

(52) U.S. Cl. ............... 315/246; 315/307; 315/360
(58) Field of Classification Search ............ 315/209 R, 315/246, 291, 307, 360, 362, 77, 80, 82; 307/10.8
See application file for complete search history.

(56) References Cited

U.S. PATENT DOCUMENTS

| | | | | |
|---|---|---|---|---|
| 5,012,392 A | * | 4/1991 | Hochstein | ............ 362/4 |
| 6,320,330 B1 | * | 11/2001 | Haavisto et al. | ............ 315/291 |
| 6,867,757 B1 | * | 3/2005 | Nakamura | ............ 345/83 |
| 6,950,079 B2 | * | 9/2005 | Inoue | ............ 345/46 |
| 2004/0001076 A1 | * | 1/2004 | Leng et al. | ............ 345/690 |

FOREIGN PATENT DOCUMENTS

| | | |
|---|---|---|
| JP | 11-233276 A | 8/1999 |
| JP | 2003-338396 A | 11/2003 |

* cited by examiner

*Primary Examiner*—Thuy Vinh Tran
(74) *Attorney, Agent, or Firm*—Birch, Stewart, Kolasch & Birch, LLP

(57) ABSTRACT

An initial driving voltage fixing a desired luminance of a light-emitting source is set at a voltage lower than that of a power supply; the light-emitting source is driven by applying a light-emitting source driving voltage at the initial driving voltage; and then, a CPU determines whether or not the power supply voltage has dropped down the initial driving voltage. When the power supply voltage has become lower than the initial driving voltage, the CPU applies the light-emitting source driving voltage to the source at the power supply voltage, and holds an undervoltage information of the power supply that the power supply voltage has dropped. When the CPU detennined that the power supply voltage had returned higher than or equal to the initial driving voltage after holding the undervoltage information, the CPU gradually returns the light-emitting source driving voltage to the initial driving voltage.

9 Claims, 3 Drawing Sheets

| TIME (OBSERVING POINT) | t1 | t2 | t3 | t4 | t5 | t6 | t7 | t8 | t9 | t10 | t11 |
|---|---|---|---|---|---|---|---|---|---|---|---|
| Vin[V] | 14.0 | 8.0 | 14.0 | 8.0 | 14.0 | 8.0 | 14.0 | 14.0 | 14.0 | 14.0 | 14.0 |
| D | 0.51 | 1.00 | 0.37 | 1.00 | 0.37 | 1.00 | 0.37 | 0.41 | 0.46 | 0.51 | 0.51 |
| Vo[V] | 10.0 | 8.0 | 8.5 | 8.0 | 8.5 | 8.0 | 8.5 | 9.0 | 9.5 | 10.0 | 10.0 |

DRIVING VOLTAGE CONTROLLER FOR LIGHT-EMITTING SOURCE

BACKGROUND OF THE INVENTION

1. Field of the Invention

The present invention relates to a driving voltage controller for a light-emitting source, which controls a driving voltage that drives and lights a light-emitting source, and more particularly, relates to a driving voltage controller for a light-emitting source, which is used for preventing the luminance flicker of the light-emitting source caused by a change in the power supply voltage, by performing the PWM (pulse-width modulation) control of the driving voltage.

2. Description of Related Art

In general, a system, which supplies electric power to a light-emitting source from a power supply, and which further supplies power to an electric power load other than the light-emitting source from the same power supply, is known. For example, in a motor vehicle, light-emitting sources and motors are driven with one battery serving as a power supply.

However, there is a trend toward more and more electrical appliances such as an air-conditioner, a navigation system, and an audio system, which are electric power-supply loads, in a vehicle. When electric power is supplied from one battery to power-supply loads such as light-emitting sources and various electrical systems, there occurs a problem that the battery voltage (power supply voltage) changes caused by the turning-on-or-off of the power to the power-supply loads. This change of the power supply voltage causes a luminance-flickering phenomenon in the light-emitting sources.

Known methods for preventing such flicker include a method of PWM-controlling the driving voltage applied to an illumination lamp or a light-emitting source. For example, a battery power source is equipped with a voltage regulator in which a resistor and a Zener diode are connected in series.

Further, for example, JP-A-11-233276 (in Paragraphs [0012] to [0016] and FIG. 1) discloses an illumination adjusting method by which the illumination of an illumination lamp or a light-emitting source is adjusted by the following method: a switching transistor is added to the above voltage regulator; the positive side DC voltage of an electrolytic capacitor, which is obtained by applying a PWM signal to the base of the switching transistor to convert the PWM signal into the voltage, is applied to the base of a driving transistor; power is supplied from a power supply to the light-emitting source by use of this driving transistor; and thereby the DC voltage impressed to the base of the driving transistor is controlled with respect to voltage by changing the pulse width of the PWM signal.

Moreover, JP-A-2003-338396 (in Paragraphs [0017] to [0035] and FIGS. 1-3) discloses a method of preventing the flicker of a light-emitting source, characterized in that, when the light-emitting source is driven and lit by means of PWM control by use of a power supply voltage, the duty ratio of a PWM signal is changed according to the fluctuation of the power supply voltage, and the frequency of the PWM signal at the start of driving power-supply loads other than the light-emitting source is controlled such that the frequency thereof is higher than that of the PWM signal at the stationary time.

Here, when controlling the duty ratio of the PWM signal according to the fluctuation of the power supply voltage, the higher is the frequency of the PWM signal, the easier is to PWM-control the light-emitting source at the optimum duty ratio according to the fluctuation of the power supply voltage. However, constantly setting the frequency of the PWM signal at a higher value not only increases the heat generation from the high-speed switch, but also causes the increase of noise. For this reason, the PWM signal is controlled such that the frequency thereof becomes higher only at the startup time of the other power-supply loads.

Further, by this flicker-preventing method, when the power supply voltage V returns to a stable state after having been momentarily greatly changed at the startup time of the other power-supply loads, the duty ratio of the PWM control is changed at high speed to thereby perform the optimum PWM control of the light-emitting source, while at the stable state of the power supply voltage, the frequency of the PWM signal is comparatively reduced such that the occurrence of the problem of the heat generation by the high-speed switch is prevented.

The conventional driving voltage controller of a light-emitting source is arranged as mentioned above. That is, the driving voltage controller of the light-emitting source is arranged such that the illumination of the illumination lamp or the light-emitting source is adjusted by: changing the pulse width of the PWM signal; applying the positive side DC voltage of the electrolytic capacitor, which is obtained by converting the PWM signal into the voltage, to the base of the driving transistor; and controlling the DC voltage applied to the base of the driving transistor with respect to voltage. For this reason, there is a problem that the amount of heat generated by the driving transistor to which the DC voltage is applied becomes large.

In addition, the conventional driving voltage controller of the light-emitting source must be equipped with various circuit elements. As a result, there is a problem that not only the scale of the circuit of the controller must be large, but also the driving transistor itself must be expensive for coping with the heat generation.

Moreover, in the conventional driving voltage controller of the light-emitting source, there is a problem that, when the power supply voltage repeats the rapid change, the luminance of the light-emitting source actually changes for responding to the change of the voltage, resulting in the increase of the flicker, which is visually perceived by the user.

Additionally, in the conventional driving voltage controller of the light-emitting source, it is arranged that the duty ratio of the PWM signal be changed according to the fluctuation of the power supply voltage, and the frequency of the PWM signal at the start of driving the power-supply loads other than the light-emitting source be controlled such that the frequency thereof is higher than that of the PWM signal at the stationary time. Therefore, when the power supply voltage returned to its original stationary state after the voltage rapidly dropped, the driving voltage of the light-emitting source also rapidly returns to its original stationary state in response thereto. For this reason, there is a problem that the light-emitting source of which luminance once reduced rapidly increases its luminance, which causes the flicker thereof to feel like as if it is increased.

SUMMARY OF THE INVENTION

The present invention has been accomplished to solve the above-mentioned problem. An object of the present invention is to provide a driving voltage controller for a light-emitting source, the controller having a small circuit scale, and being capable of reducing flicker caused by the light-emitting source when a power supply voltage returned to its original stationary state after the voltage rapidly changed.

According to a driving voltage controller for a light-emitting source of the present invention, when controlling a light-emitting source driving voltage applied to the light-emitting source, an initial driving voltage fixing the desired luminance of the light-emitting source is established, and the light-emitting source is driven by applying the light-emitting source driving voltage at the initial driving voltage; then, it is determined whether or not a power supply voltage has dropped below the initial driving voltage; when the power supply voltage has dropped below the initial driving voltage, the controller applies the light-emitting source driving voltage thereto at the power supply voltage, and holds the undervoltage information of the power supply that the power supply voltage has dropped therebelow; and after holding the undervoltage information of the power supply, when the controller determined that the power supply voltage has returned higher than or equal to the initial driving voltage, the controller gradually returns the light-emitting source driving voltage to the initial driving voltage.

According to the present invention, it is arranged that, when the power supply voltage rapidly dropped to fall below the initial driving voltage, the power supply voltage be temporarily straight used for the light-emitting source driving voltage; however, when the power supply voltage returned higher than or equal to the initial driving voltage, the light-emitting source driving voltage be gradually returned to the initial driving voltage. As a result, the luminance of the light-emitting source does not rapidly rise, and the luminance, which is visually perceived by the user, gradually increases, thereby enabling the flicker, which is caused by the light-emitting source and is perceived by the user, to be reduced.

DETAILED DESCRIPTION OF THE PREFERRED EMBODIMENTS

An embodiment of the present invention will now be described in details by reference to the drawings.

Embodiment 1

Figure 1:
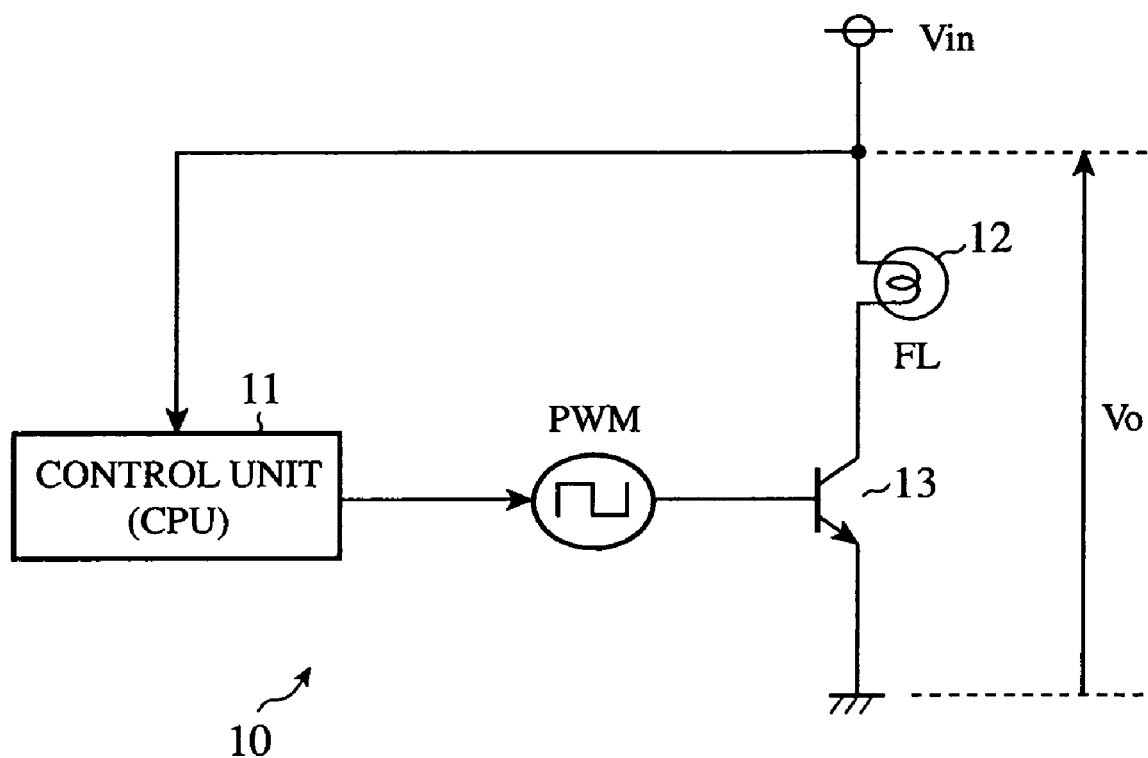
FIG. 1 is a circuit block diagram showing one example of a driving voltage controller for a light-emitting source, according to a first embodiment of the present invention.

FIG. 1 is a circuit block diagram showing one example of a driving voltage controller for a light-emitting source in a first embodiment for carrying the present invention into effect. The driving voltage controller for the light-emitting source, shown in the figure, is mounted on a vehicle, for example, and is used to control the driving voltage of the light-emitting source of the audio equipment or the navigation device, or of the room lamp, and thereby prevent the luminance flicker of the source or of the lamp.

The driving voltage controller for the light-emitting source 10 includes a control unit (CPU) 11 such as a microcomputer, and this CPU 11 observes the power supply voltage Vin of an on-vehicle power supply (for example, a battery, not shown) at predetermined time intervals. The power supply voltage Vin is connected to a light-emitting source (FL) 12, and further, the light-emitting source 12 is connected to the collector of a switching transistor 13. The emitter of this switching transistor 13 is grounded.

The CPU 11 performs the on-off control of the switching transistor 13 by means of PWM control. In other words, as described later, the CPU 11 gives a PWM signal to the base of the switching transistor 13, and changes the duty ratio (D) of this PWM signal according to the power supply voltage Vin (This means that the CPU performs the on-off control of the power supply voltage by use of the PWM signals, to thereby control the light-emitting source driving voltage.).

On the other hand, a vehicle is equipped with various electrical systems such as an air-conditioner, a navigation device, and an audio system, acting as power-supply loads, in addition to the light-emitting source 12 and a motor, which is driven when starting the engine. These power-supply loads such as the light-emitting source 12, motor, and various electrical systems are all supplied with electric power from a battery. As a result, there comes up a problem that the power supply voltage Vin of the battery inevitably fluctuates. The fluctuation of the power supply voltage Vin fluctuates the luminance of the light-emitting source 12 to cause the flicker thereof to occur.

Assuming that the voltage applied to the series circuit of the light-emitting source 12 and the switching transistor 13 is the light-emitting source driving voltage Vo, when the power supply voltage Vin once dropped below the light-emitting source driving voltage Vo and then returned to its original state (that is, the state of Vin>Vo), the light-emitting source driving voltage Vo also returns to its original state, following the return of the power supply voltage Vin. Therefore, the luminance of the light-emitting source 12 once dropped below a predetermined luminance level, and then returns to the predetermined luminance level.

If the power supply voltage Vin rapidly drops, the luminance flicker of the light-emitting source occurring when the power supply voltage Vin returned, becomes large. The CPU 11 shown in the figure performs the PWM control of the circuit as described later to prevent the flicker caused by the return of the power supply voltage after such rapid reduction of the voltage.

The operation will now be described as below.

Figure 2:
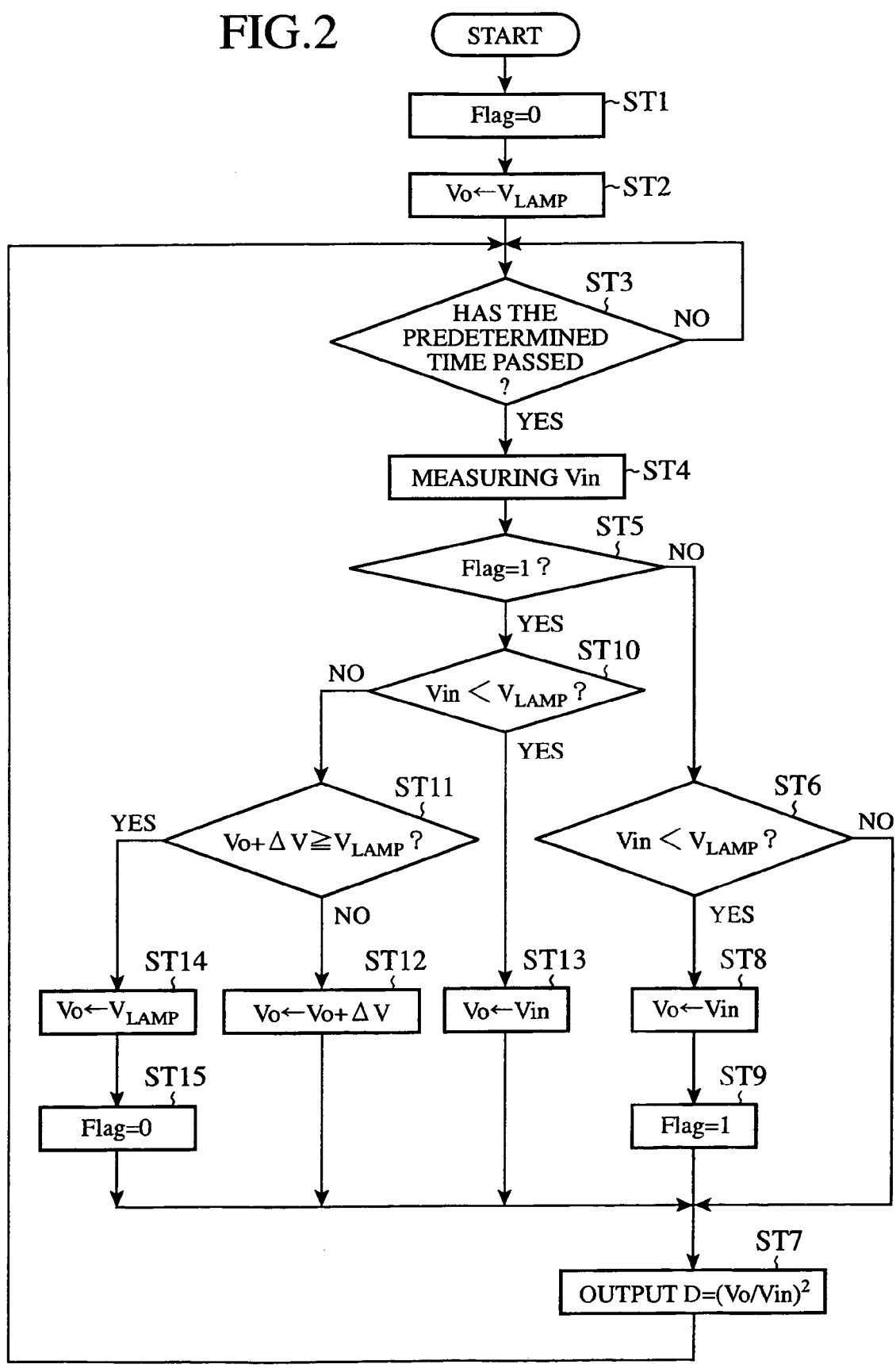
FIG. 2 is a flow chart explaining the operation of the circuit of the driving voltage controller for the light-emitting source, shown in FIG. 1.
Figures 3, 4:
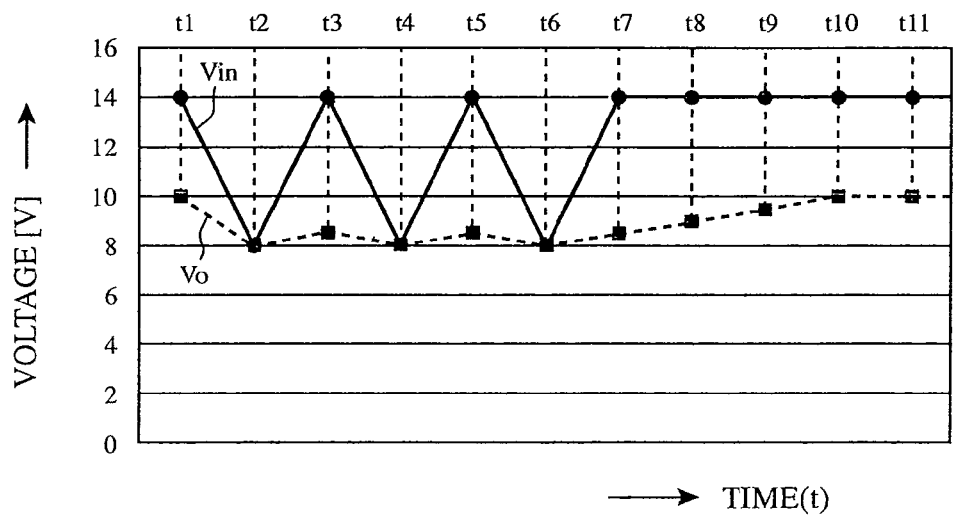
FIG. 3 is a graph illustrating changes in the light-emitting source driving voltage in the circuit of the driving voltage controller for the light-emitting source shown in FIG. 1 with changes in the power supply voltage.
FIG. 4 is a table showing the relationship between the power supply voltages, the duty ratios, and the light-emitting source driving voltages at measuring points of time.

Referring to FIGS. 1-3, when the user set the light-emitting source at a desired luminance by entering data into the CPU 11 with an input device (not shown), the CPU 11 establishes the light-emitting source driving voltage according to the desired luminance of the light-emitting source as an initial driving voltage $V_{LAMP}$ (This initial driving voltage $V_{LAMP}$ is lower than the power supply voltage Vin.). The CPU 11 produces a PWM signal according to the initial driving voltage $V_{LAMP}$ as describe later, performs the on-off control of the switching transistor 13, and applies the light-emitting source driving voltage Vo to the light-emitting source 12.

Let it be assumed that the power supply voltage of the battery Vin is 14V, and the initial driving voltage $V_{LAMP}$ is 10V. When the switch (not shown) of the light-emitting source or the equivalent is turned on (Start), the CPU 11 first sets "Flag" at 0 (Flag=0) (ordinary mode) (Step ST1), and then performs the on-off control of the switching transistor 13 by means of PWM control by setting the light-emitting source driving voltage Vo at the initial driving voltage $V_{LAMP}$ (Step ST2), to thereby apply the light-emitting source driving voltage Vo according to the initial driving voltage $V_{LAMP}$ to the light-emitting source 12.

The CPU 11 observes the power supply voltage Vin on a preprogrammed cycle (that is, at predetermined time-spaced intervals). When CPU 11 counted a predetermined elapsed time (Step ST3), the CPU 11 measures the power supply voltage Vin to obtain a measurement (Step ST4). The CPU 11 determines whether or not Flag=1 (When Flag=1, the CPU goes into voltage-returning mode as described later) (Step ST5). Because Flag=0 immediately after the switch of the light-emitting source is turned on, the processing continues to Step ST6, and in the Step ST6, the CPU 11 determines whether or not the power supply voltage Vin<the initial driving voltage $V_{LAMP}$.

When the power supply voltage Vin≧the initial driving voltage $V_{LAMP}$ in the Step ST6, the CPU 11 calculates the duty ratio (D)=(Vo/Vin)² to give a PWM signal having the duty ratio D=(Vo/Vin)² to the base of the switching transistor 13 (Step ST7, Output D=(Vo/Vin)²). Then, the processing returns to the Step ST3, and the CPU 11 determines whether or not the predetermined time has elapsed again.

For example, if the CPU 11 measured the power supply voltage Vin at the time indicated with the time (observing point of time) t1 shown in FIG. 3, the Vin is 14V at this point. Therefore, the CPU 11 sets $V_{LAMP}$=Vo=10V. The duty ratio D is 0.51 at this point.

In contrast, if the power supply voltage Vin<the initial driving voltage $V_{LAMP}$, the CPU 11 determines that there occurred a change having an influence on the light-emitting source driving voltage Vo, in the power supply voltage Vin. The CPU 11 sets the light-emitting source driving voltage Vo at the power supply voltage Vin (Step ST8), and then sets the Flag at 1 (Flag=1) (The CPU holds the undervoltage information of the power supply, and enters power-supply returning mode. Step ST9). The CPU 11 calculates the duty ratio, as previously stated in the Step ST7.

For example, if the CPU 11 measured the power supply voltage Vin at the time indicated with the time (observing point of time) t2 shown in FIG. 3, the power supply voltage Vin has rapidly dropped to 8V at this point. Therefore, the CPU 11 sets the light-emitting source driving voltage Vo=8V. The duty ratio D is 1.00 at this point. In other words, the CPU 11 sets the duty ratio D=1.00 to set the light-emitting source driving voltage Vo=8V.

As stated above, when the power supply voltage Vin<the initial driving voltage $V_{LAMP}$, the Flag is set at 1 (Flag=1). When the predetermined time has passed in the Step ST3, the CPU 11 measures the power supply voltage Vin in the Step ST4, and then determines whether or not Flag=1 in the Step ST5. Because Flag=1 at this time, the CPU 11 enters the light-emitting source driving-voltage returning mode, and the CPU 11 first determines whether or not the power supply voltage Vin<the initial driving voltage $V_{LAMP}$ (Step ST10).

If the power supply voltage Vin≧the initial driving voltage $V_{LAMP}$, the CPU 11 adds a predetermined potential difference ΔV (for example, 0.5V) to the light-emitting source driving voltage Vo to obtain Vo+ΔV, and the CPU 11 determines whether or not the Vo+ΔV≧the initial driving voltage $V_{LAMP}$ (Step ST11).

When the Vo+ΔV<the initial driving voltage $V_{LAMP}$ in the Step ST11, the CPU 11 sets the light-emitting source driving voltage Vo at the Vo+ΔV (Step ST12), then calculates the duty ratio D in the Step ST7, and changes the frequency of the PWM signal. Subsequently, the processing returns to the Step ST3.

For example, if the CPU 11 measured the power supply voltage Vin at the time indicated with the time (observing point of time) t3 shown in FIG. 3, the power supply voltage Vin has returned to 14V from 8V at this point. However, if the light-emitting source driving voltage Vo is abruptly returned from 8V to 10V, the user actually visually perceives that a flicker occurred in the luminance of the light-emitting source, because of the rapid change in the light-emitting source driving voltage Vo.

Then, the CPU 11 assigns Vo+ΔV=8.5V to the light-emitting source driving voltage (that is, the CPU increases the light-emitting source driving voltage Vo from 8V to 8.5V), thereby preventing the occurrence of the luminance flicker of the light-emitting source that would be caused by the rapid change in the light-emitting source driving voltage Vo. In the example shown in the figure, at the time t3, the CPU 11 sets the light-emitting source driving voltage Vo=8.5V (The power supply voltage Vin is 14V.), and sets the duty ratio D=0.37.

When the predetermined time has passed, the CPU 11 measures the power supply voltage Vin in the Step ST4 again, and then determines whether or not the Flag=1 in the Step ST5. Because the Flag remains 1 (Flag=1) at this time, the CPU 11 determines whether or not the power supply voltage Vin<the initial driving voltage $V_{LAMP}$ in the Step ST10. If the power supply voltage Vin has dropped below the initial driving voltage $V_{LAMP}$, the CPU 11 sets the light-emitting source driving voltage Vo at the power supply voltage Vin (Step ST13), and then calculates the duty ratio D in the Step ST7.

When the power supply voltage Vin measured at the time indicated with the time (observing point of time) t4 shown in FIG. 3 has dropped to 8V, for example, again, the CPU 11 sets the light-emitting source driving voltage Vo at 8V, and sets the duty ratio D=1.00. When the power supply voltage Vin has become 14V at the next measuring time (observing point in time) t5, the CPU 11 sets the light-emitting source driving voltage Vo at 8.5V at the time t5, as described above, to thereby prevent the rapid change in the driving voltage (the duty ratio D=0.37 at this time).

Further, when the power supply voltage Vin measured at the time indicated with the time (observing point of time) t6 shown in FIG. 3 has dropped to 8V, the CPU 11 sets the light-emitting source driving voltage Vo at 8V (the duty ratio D=1.00). Moreover, when the power supply voltage Vin measured at the time indicated with the time (observing point of time) t7 shown in FIG. 3 has returned to 14V again, the CPU 11 sets the light-emitting source driving voltage Vo at 8.5V as described above (the duty ratio D=0.37).

Subsequently, the CPU 11 measures the power supply voltage Vin at the time indicated with the time (observing point of time) t8 shown in FIG. 3. If this power supply voltage Vin is 14V, the CPU 11 determines that the power supply voltage Vin≧the initial driving voltage $V_{LAMP}$ in the Step ST10, and furthermore, the CPU 11 determines whether or not Vo+ΔV≧the initial driving voltage $V_{LAMP}$ in Step ST11.

Because at the time indicated with the time (observing point of time) t8 shown in FIG. 3, Vo+ΔV<the initial driving voltage $V_{LAMP}$, the CPU 11 sets the light-emitting source driving voltage Vo at the Vo+ΔV, in Step ST12, and further, calculates the duty ratio D in the Step ST7. That is, at the time indicated with the time t8, the CPU 11 sets the light-emitting source driving voltage Vo at 9V (setting the duty ratio D=0.41).

Then, the CPU 11 measures the power supply voltage Vin at the time indicated with the time (observing point of time) t9 shown in FIG. 3. If this power supply voltage Vin is 14V, the Vo+ΔV<the initial driving voltage $V_{LAMP}$ at the time t9. Therefore, the CPU 11 sets the light-emitting source driving voltage Vo at the Vo+ΔV in Step ST12, and further, calculates the duty ratio D in the Step ST7. In other words, at the time indicated with the time t9, the CPU 11 sets the light-emitting source driving voltage Vo at 9.5V (setting the duty ratio D=0.46).

After that, the CPU 11 measures the power supply voltage Vin at the time indicated with the time (observing point of time) t10 shown in FIG. 3. If this power supply voltage Vin is 14V, for example, the Vo+ΔV≧the initial driving voltage $V_{LAMP}$ at the time t10. Therefore, the CPU 11 sets the light-emitting source driving voltage Vo at the initial driving voltage $V_{LAMP}$ (Step ST14), sets Flag=0 to return to the ordinary mode (Step ST15), and then calculates the duty ratio D in the Step ST7. That is, at the time indicated with the time t10, the CPU 11 establishes the light-emitting source driving voltage Vo=$V_{LAMP}$=10V (setting the duty ratio D=0.51).

After that, the CPU 11 measures the power supply voltage Vin at the time indicated with the time (observing point of time) t11 shown in FIG. 3, and the Flag=0 at this time. Therefore, in the Step ST6, the CPU 11 determines whether or not the power supply voltage Vin<the initial driving voltage $V_{LAMP}$, and performs the processing as described above. Because the power supply voltage Vin is 14V at the time indicated with the time t11 shown in FIG. 3, the CPU 11 sets the light-emitting source driving voltage Vo=10V (setting the duty ratio D=0.51). FIG. 4 shows the relationship between the power supply voltage Vin (V), the duty ratio D, and the light-emitting source driving voltage at the above-described times t1-t11.

As stated above, it is arranged that, when the power supply voltage Vin rapidly changed to drop below the initial driving voltage $V_{LAMP}$, and then the power supply voltage Vin returned to a state of being higher than the initial driving voltage $V_{LAMP}$, the state continuing, the light-emitting source driving voltage Vo be gradually increased according to the predetermined potential difference ΔV, and thereby be returned to the initial driving voltage $V_{LAMP}$. As a result, when the situation in which the power supply voltage Vin rapidly dropped and then the voltage returned to its original voltage occurred, the change in the luminance of the light-emitting source that is visually perceived by the user reduces, thereby enabling the luminance flicker of the light-emitting source to be reduced.

Furthermore, because the switching transistor 13 is controlled by the CPU 11 as described above, and in other words, because the switching transistor 13 is controlled by means of PWM (on-off) control by use of software, the heat generated from the switching transistor 13 can be reduced, and further, the circuit scale can be reduced.

As is apparent from the above-described explanation, the CPU 11 comprehensively serves as a determining means, a voltage-adjusting means, and a voltage-returning means.

As mentioned above, according to the first embodiment, the driving voltage controller of the light-emitting source is arranged such that, when the power supply voltage Vin rapidly dropped and became lower than the initial driving voltage $V_{LAMP}$, the power supply voltage Vin is temporarily straight used as the light-emitting source driving voltage Vo; and when the power supply voltage Vin returned higher than or equal to the initial driving voltage $V_{LAMP}$, the light-emitting source driving voltage Vo is gradually returned to the initial driving voltage $V_{LAMP}$. As a result, the luminance of the light-emitting source does not rapidly increase, and the luminance of the light-emitting source that is visually perceived by the user gradually increases, which can reduce the flicker of the light-emitting source.

What is claimed is:

1. A driving voltage controller for a light-emitting source, which controls a light-emitting source driving voltage that is applied to the light-emitting source, the driving voltage controller comprising:

determining means for determining if a power supply voltage drops below an initial driving voltage after the initial driving voltage fixing a desired luminance of the light-emitting source is established and the light-emitting source is driven by applying the light-emitting source driving voltage thereto at the initial driving voltage;

voltage-adjusting means for causing the light-emitting source driving voltage to be applied thereto at the power supply voltage when the power supply voltage drops below the initial driving voltage, and for holding undervoltage information of the power supply when the power supply voltage drops therebelow; and voltage-returning means for gradually returning the light-emitting source driving voltage to the initial driving voltage when the determining means determines that the power supply voltage has returned to a level higher than or equal to the initial driving voltage after the voltage-returning means holds the undervoltage information of the power supply.

2. A driving voltage controller for a light-emitting source according to claim 1, wherein the voltage-adjusting means and the voltage-returning means each change a duty ratio of a pulse width modulator signal that performs the on-off control of the power supply voltage to control the light-emitting source driving voltage.

3. A driving voltage controller for a light-emitting source according to claim 1, wherein the determining means observes the power supply voltage at observing points of time that are determined by predetermined time interval, and the voltage-returning means cause the light-emitting source driving voltage to be applied thereto at the power supply voltage when the power supply voltage again drops below the initial driving voltage at the observing point of time subsequent to an observing point of time at which the power supply voltage returns higher than or equal to the initial driving voltage, though the voltage-adjusting means holds the undervoltage information of the power supply.

4. A driving voltage controller for a light emitting source according to claim 1, wherein the voltage-returning means gradually returns the light-emitting source driving voltage to the initial driving voltage by adding a predetermined potential difference to the light-emitting source driving voltage when the state at which the power supply voltage is higher than or equal the initial driving voltage continues at observing points of time.

5. A method of controlling an output voltage supplied to a light-emitting source by a drive circuit which receives a supply voltage that may be subject to variation and produces a drive voltage across the light emitting source, comprising:

setting an initial driving voltage to the supply voltage supplied the light emitting source after it is initially driven to a desired luminance;

after the desired luminance is achieved, increasing the output voltage with respect to the supply voltage when the supply voltage drops below the initial driving voltage; and gradually increasing the output voltage with respect to the supply voltage until it is substantially at the initial driving voltage when the output voltage returns to higher than or equal to the initial driving voltage after the supply voltage falls below the initial lamp voltage.

6. The method of claim 5, wherein the step of increasing changes a duty ratio of a pulse width modulator signal to vary the output voltage.

7. The method of claim 5, wherein the light emitting source is first driven to a desired luminance in said step of setting on of after an observing point of time, the step of setting causing the output voltage to be applied to the light-emitting source subsequent to the observing point of time at which time the output voltage is higher than or equal to the initial driving voltage.

8. A method of controlling a driving voltage supplied to a light-emitting source according to claim 5, wherein the step of gradually increasing gradually returns the output voltage to the initial driving voltage by adding a predetermined potential difference to the output voltage when the state at which the output voltage is higher than or equal the initial driving voltage continues at the observing points of time.

9. A luminance device controller for driving a luminance device while reducing flicker comprising:
a controller including,
  a processor, and
  a computer-readable storage medium having a computer program stored therein, the computer program controlling the processor to perform the steps of,
  setting an initial driving voltage to the supply voltage supplied the light emitting source after it is initially driven to a desired luminance;
  after the desired luminance is achieved, increasing the output voltage with respect to the supply voltage when the supply voltage drops below the initial driving voltage, and
  gradually increasing the output voltage with respect to the supply voltage until it is substantially at the initial driving voltage when the output voltage returns to higher than or equal to the initial driving voltage after the supply voltage falls below the initial lamp voltage;
the controller supplying a driving voltage to the luminance device.

* * * * *